United States Patent [19]

Narjes

[11] Patent Number: 4,711,976

[45] Date of Patent: Dec. 8, 1987

[54] DATA TRANSMISSION FACILITY

[75] Inventor: Ferdinand Narjes, Munich, Fed. Rep. of Germany

[73] Assignee: Siemens Aktiengesellschaft, Berlin and Munich, Fed. Rep. of Germany

[21] Appl. No.: 804,094

[22] Filed: Dec. 3, 1985

[30] Foreign Application Priority Data

Dec. 5, 1984 [DE] Fed. Rep. of Germany ....... 3444361

[51] Int. Cl.⁴ .................. H04Q 1/30; H04L 15/00
[52] U.S. Cl. .................................. 178/2 C; 178/2 R
[58] Field of Search .................. 178/2 C, 2 E, 2 R, 3, 178/4; 455/68, 70; 179/2 DP

[56] References Cited

U.S. PATENT DOCUMENTS 3,816,645  6/1974  Ehrich et al. .................. 178/2 R X Primary Examiner—Stafford D. Schreyer
Attorney, Agent, or Firm—Hill, Van Santen, Steadman & Simpson

[57] ABSTRACT

A data transmission facility comprises a central station and a plurality of substations connected thereto via a data bus, the substations outputting a control signal dependent on the transmission or reception condition thereof. A plurality of substations are therefore capable of being connected to a serial point-to-point interface of the central station by way of a coupling device which is reversible with respect to the direction of transmission by optional activation or deactivation of level converters on the basis of control signals transmitted by the central station or by the substations. The data transmission facility is particularly suited for the transmission of operating state signals from intermediate locations of a communications transmission facility to a central evaluation facility.

9 Claims, 2 Drawing Figures

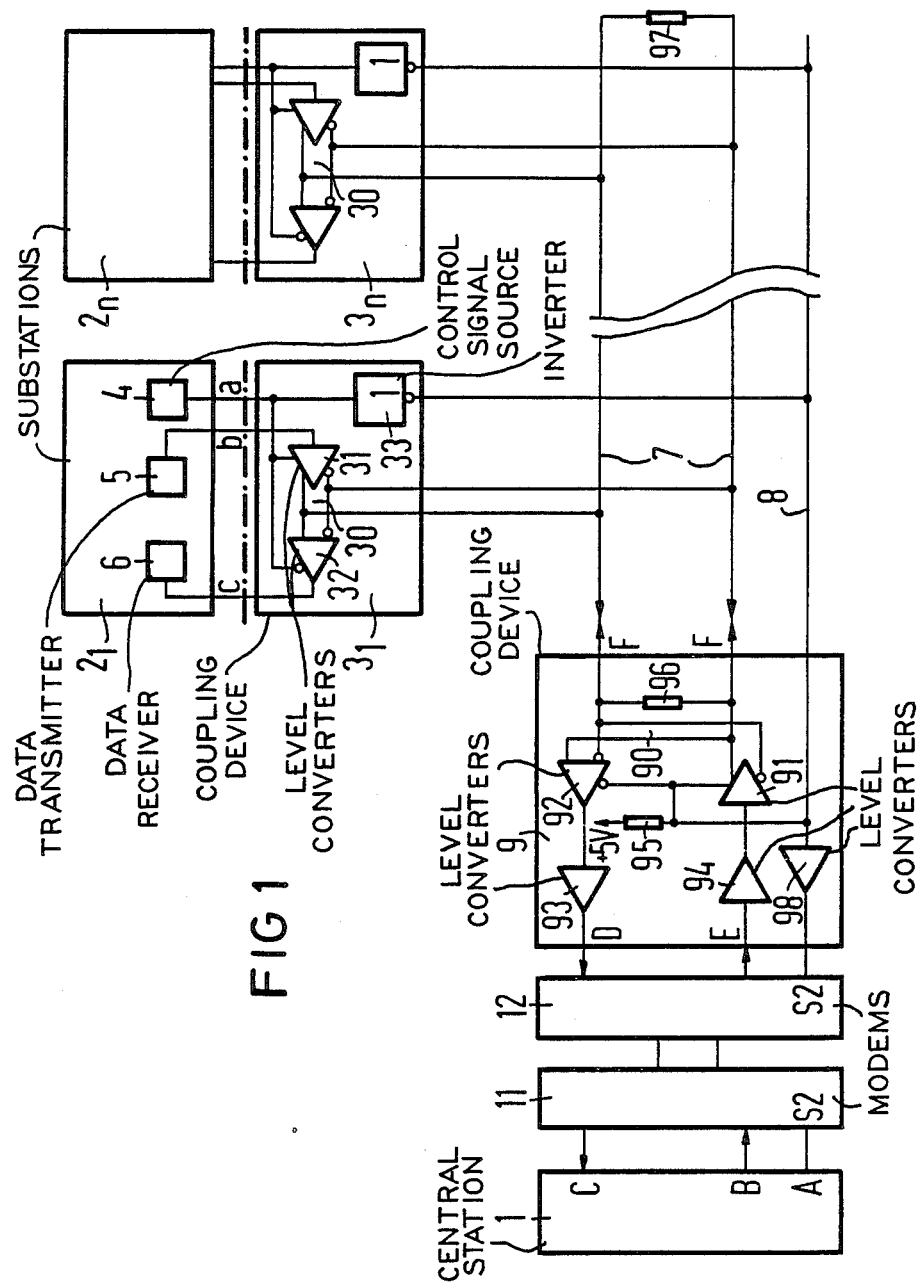

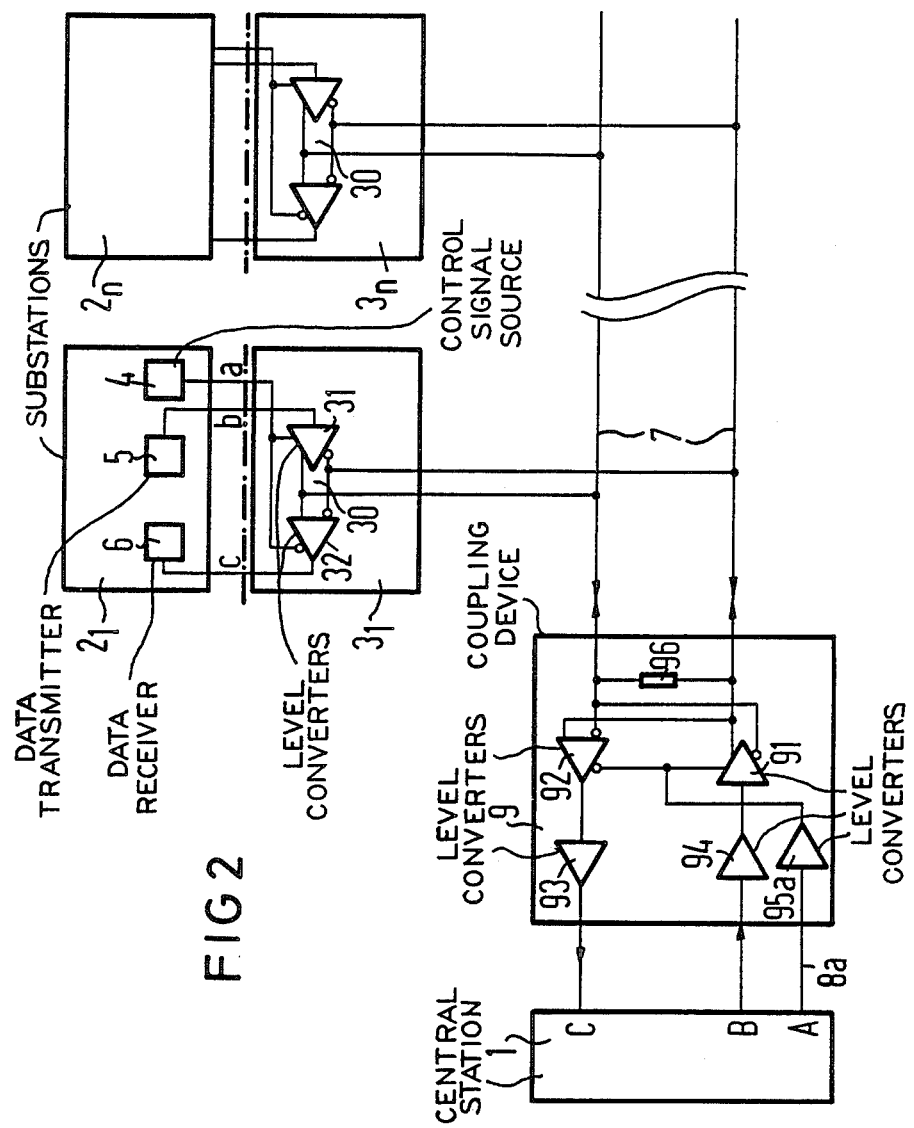

DATA TRANSMISSION FACILITY

BACKGROUND OF THE INVENTION

1. Field of the Invention

The present invention relates to a data transmission facility comprising a central station and substations respectively containing a data transmitter and a data receiver, in which the substations are connected to the central station by way of a data bus, in which, of the central station and the substations, only one transmits at one and the same time and the central station and/or the substations respectively comprise a control signal terminal which outputs a first control signal given a transmitting central station or, respectively, substation and outputs a second control signal given a central station or, respectively, a substation which is ready to receive.

2. Description of the Prior Art

A data transmission facility of the type set forth above is known from the German allowed and published application No. 22 51 608. In this known data transmission facility, modems of the stations output voice frequency pulses to a bus line.

The known data transmission facility is a matter of a remote control facility. When the remote control station wishes to output a pulse message or, respectively, a data protocol, it outputs a control signal already present in the remote control facility for characterizing a transmission authorization or readiness to receive, this control signal, among other things, activating or deactivating a switching amplifier which follows the transmission modulator of the modem. The switching amplifier and a further switching amplifier enable a common transmission and reception filter to be employed for the modem. The known station can be connected to a four-wire bus line for half-duplex operation. A coupling device is required for this purpose.

Coupling devices for coupling the modem of the remote control station to a four-wire line are disclosed in the German allowed and published application No. 20 48 140. In one embodiment, a plurality of hybrids are employed, while in another embodiment the coupling device is composed of a plurality of feedback-free transmission quadripoles.

Further, transmitters and receivers for data signals are already known which output or, respectively, receive direct voltage or direct current pulses. Asymmetrical and symmetrical interfaces for point-to-point connections or multiple connections are therefore known. A number of serial interfaces only permit point-to-point connections since only one driver can be connected to a line. This is the case, for example, given the wide-spread interfaces according to the EIA standards RS 232 C, RS-423 A, RS-422 A and the corresponding CCITT interfaces V24/V28, V10, V11, X26, X27. These interfaces are known, for example, from the publication CCITT, Yellow Book, Vol. VIII, fascicle VIII. 1, pp. 27-42, 43-55, 97-112, 161-165 and fascicle VIII. 2, pp. 190. This is insufficient for many applications.

The publication Elektronik No. 6/23.3.1984, p. 24, also discloses a serial interface according to EIA standard RS 485 which permits bus connections to up to 32 drivers.

However, there are numerous control and evaluation computers which are provided with a serial point-to-point interface and are suitable as a central station or, respectively, a routing central station of a data remote transmission facility.

SUMMARY OF THE INVENTION

The object of the present invention is to provide a data transmission facility of the type generally set forth above such that a plurality of stations can be connected to one and the same input of the central station which has a serial point-to-point interface.

According to the invention, the data transmission facility is constructed as basically set forth above and is characterized in that the central station has a coupling device assigned thereto which is connected via a data bus to coupling devices of the substations, and in that the coupling device of the central station is controllable by the control signals of the central station or of the substations such that the level converters connected to the data output are activated given a central station ready to transmit and the level converters preceding the data input are activated given a central station ready to receive. The switching matrix network assigned to the central station can thereby be directly connected to the central station or can be connected to the central station via modems of the transmission facility.

On the basis of the foregoing measures, a plurality of stations can be advantageously connected via a common data line to one and the same terminal of the central station, although the central station is equipped with an interface designed for point-to-point connection, a computer there by particularly serves as the central station or, respectively, a routing station.

The data transmission facility constructed in accordance with the present invention is particularly suited for remote control devices for the transmission of operating state signals from intermediate locations or, respectively, repeater fields of a communications transmission facility to a central evaluation device.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic representation of a data transmission facility comprising a central station connected via a coupling device to substations having a parallel bus interface, in particular comprising control of the coupling device by substations via a control line; and FIG. 2 is a schematic representation of a data transmission facility comprising a central station which is connected by way of a coupling device to substations having a parallel bus interface, and in particular comprising control of the coupling device by the central station.

DESCRIPTION OF THE PREFERRED EMBODIMENTS

Given the remote control facility illustrated in FIG. 1, a plurality of substations 2 are connected to an input C and to an output B of a central station 1. The central station or, respectively, central routing station is particularly formed by a computer and has a serial standard interface for point-to-point transmission at its input C and at its output B, particularly an interface in accordance with RS 232 C. Of a plurality of n stations, only the substations $2_1$ and $2_n$ are illustrated.

The substations $2_1 \ldots 2_n$ are identically constructed and respectively contain a data transmitter 5 and a data receiver 6. They are activated via a data line 7 and output pulse messages or, respectively, data protocols to the input C of the central station 1 in chronological succession via the data line 7.

The receivers 6 of the substations $2_1 \ldots 2_n$ are respectively connected to the data line 7 via a coupling device $3_1 \ldots 3_n$, so that they can be controlled, synchronized or activated by the central station in accordance with the procedures known for this purpose.

Every substation $2_1 \ldots 2_n$ is provided with an interface or, respectively, with a coupling device $3_1 \ldots 3_n$ whose receiving portion contains a level converter 32 and whose transmitting portion contains a level converter 31. A control signal source 4 controls the level converters 31 and 32 in such a manner that the level converter 31 is activated given a transmitting station and the level converter 32 is activated given a station which is ready to receive. The alternating activation and deactivation of the level converters 31 and 32 occurs in that the level converter 31 is connected to the control output a of the control signal source 4 with a non-inverting control input, but the level converter 32, by contrast, is connected to the control output a of the control signal source 4 with an inverting control input.

The direction of the data flow through the coupling devices $3_1 \ldots 3_n$ of the substations $2_1 \ldots 2_n$ is defined by the level of the control output a. This control output a is activated by the substations $2_1 \ldots 2_n$ to be monitored.

The level converters 31 and 32 are serial modules for a serial bus interface, particularly the interface RS 485. They convert the level of the bus interface into and out of the TTL level. The output of the level converter 31 is high resistive given a deactivated level converter 31.

The two level converters 31 and 32 are connected concatenated via the serial bus interface 30. The input of the level converter 31 is connected via a data output b to the data transmitter 5; the output of the level converter 32 is connected via the data input c to the data receiver 6 of the substations $2_1 \ldots 2_n$. The serial bus interfaces 30 are connected in parallel via the data line or, respectively, the data bus 7 and are conducted to the coupling device 9 assigned to the central station 1, this coupling device 9 serving as a level converter.

The data bus 7 is expanded by the control line 8. The control line 8 is connected to the inverters 33 of the coupling devices $3_1 \ldots 3_n$ and is connected to the control inputs of the level converters 91 and 92 of the coupling device 9. The level converters 91 and 92 contained in the coupling device 9 are connected concatenated with one another via the serial bus interface 90. The input of the level converter 91 is connected via the level converter 94 to the data output B of the central station 1. The output of the level converter 92 is conducted via the level converter 93 to the data input C of the central station 1.

The coupling device 9 transmits data in both directions from the point-to-point interface, particularly an interface RS 232 C of the central station or, respectively, of the control and evaluation computer, to the symmetrical double stream interface, particularly an RS 485 interface of the data bus, or vice-versa.

The modems 11 and 12 lie in the connecting path between the central station 1 and the coupling device 9. The modems 11 and 12 can be replaced by a direct connection given comparatively short distances between the central station 1 and the coupling device 9.

Given a transmitting substation $2_1 \ldots 2_n$, the control signal source 4 outputs a logical "1" and activates the level converter 31 at the transmission side. A logical "0" appears at the output of the inverter 33 which has an open collector output. The level converter 92 at the receiving side is activated and the coupling device 9 via the control line 8 and the level converter 91 at the transmitting side is deactivated via the control line 8. The substations $2_1 \ldots 2_n$ can transmit data to the central station 1 via the level converter 31 and the level converters 92, 93.

Given a substation $2_1 \ldots 2_n$ which is ready to receive, the control signal source 4 outputs a logical "0" and activates the level converter 32 at the receiving side. The output of the inverter 33 is highly resistive. Since the control line 8 is conducted via the resistor 95 to a control potential of, for example, 5 V, the control line 8 assumes the logical condition "1". In the coupling device 9, the level converter 91 at the transmitting side is activated and the level converter 92 at the receiving side is deactivated.

By way of the two modems 11 and 12, the level converters 94 and 91 and the level converter 32, the central station can transmit data to the data receiver 6 of every substation $2_1 \ldots 2_n$. The resistors 96 or, respectively, 97 terminate the data line 7 in a low-resistance manner. The control line 8 is connected via the level converter 98 to a control input of the modem 12 with the significance "request to send" (RST). The control output A of the central station 1 is connected to a control input of the modem 11 having the significance "request to send" (RST).

When the modems 11 and 12 are required, then the control line 8 is therefore doubly utilized.

In accordance with the system structure set forth in FIG. 1, the two modems 11 and 12 with a data transmission line for remote transmission of data between the control and evaluation computer and the substations $2_1 \ldots 2_n$ are inserted between the computer or, respectively, central station 1 and the coupling device 9.

The direction of the data flow through the interface or, respectively, coupling devices $3_1 \ldots 3_n$ of the substations $2_1 \ldots 2_n$ as well as through the coupling device 9 is defined by the level of the control line 8. The control line 8 is activated by the substations $2_1 \ldots 2_n$ to be monitored.

The input E or, respectively, the output D of the coupling device 9 (constructed as a bidirectional level converter) to the computer or to the modem is respectively composed of an asymmetrical double stream interface for point-to-point connection, particularly in accordance with RS 232 C. The level converters 94, 92 within the coupling device 9 convert the respective interface level into a standard level, particularly TTL, CMOS which are supplied to the level converters 93, 91. The level converters 93, 91 convert the standard levels back into the respective interface levels. The terminal pair F to which the data bus 7 is connected and which serves as the output and the input in the direction to the devices to be monitored is composed of a symmetrical double stream interface for serial, bidirectional data transmission.

The data transmission facility illustrated in FIG. 2 largely coincides with that of FIG. 1. In a departure from the structure of FIG. 1, no control line 8 and no inverter 33 are provided. This results from the fact that the coupling device 9 is not controlled by the substations $2_1 \ldots 2_n$ but, rather, is controlled by the central station 1. The control output A of the central station 1 is thereby connected by way of a control line 8a and the level converter 95a to the control inputs of the level converters 91 and 92.

The direction of the data flow for the coupling device 9 constructed as a level converter is defined by the level of the control output A of the central station 1.

Given the data transmission facility shown in FIG. 1 and the data transmission facility shown in FIG. 2, the following modules, for example, are employed.

| Ref. No. | Designation | Module No. |
|---|---|---|
| 31 and 32 | Level Converter | SN 75 176 |
| 33 | Inverter | SN 74 LS 05 |
| 91 and 92 | Level Converter | SN 75 176 |
| 93 | Level Converter | ¼ SN 75 188 |
| 94 | Level Converter | ¼ SN 75 154 |
| 95a | Level Converter | ¼ SN 75 154 |
| 98 | Level Converter | ¼ SN 75 188 |

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A data transmission facility comprising:
    a data bus;
    a central station for transmitting and receiving data including a transmitting output and a receiving input;
    a first level converter device connected between said transmitting output, said receiving input and said data bus, said first level converter device comprising a transmitting level converter, a receiving level converter and a control input connected to said level converters for receiving first and second control signals, said level converters responsive to said first control signal to condition said first level converter device for the transmission of data from said transmitting output to said data bus and responsive to said second control signal to condition said first level converter device for passing data received from said data bus to said receiving input;
    a plurality of substations each including a data transmitter and a data receiver;
    a plurality of second level converter devices each connected between a respective substation and said data bus, each of said second level converter devices comprising a transmitting level converter, a receiving level converter and a control input for receiving said first and second control signals, and responsive to said first control signal to condition said second level converter device to pass data received from said data bus to said data receiver and responsive to said second control signal to condition said second level converter device to pass data from the respective data transmitter to said data bus; and
    control signal means connected to said control signal inputs of said first and second level converter devices and operable to produce said first and second control signals.

2. The data transmission facility of claim 1, wherein:
    said control signal means comprises a signal generator in each of said substations connected to said control signal input of the respective second level converter device, a control line connected to said control signal input of said first level converter device, and an inverter connected between said signal generator and said control line.

3. The data transmission facility of claim 1, wherein:
    said control signal means comprises a signal generator in each of said substations operable to produce said first and second control signals.

4. The data transmission facility of claim 1, wherein:
    said control signal means comprises a plurality of first signal generators each located in a respective substation and each operable to produce said first and second control signals, a control line connected to said control signal input of said first level converter device, and a plurality of inverters each located in a respective second level converter device and connected between the respective signal generator and said control line and each comprising an open collector output.

5. The data transmission facility of claim 1, wherein:
    said transmitting and receiving level converters of said first and second level converter devices are respectively connected to said data bus to respectively provide a symmetrical double stream interface for serial data transmission.

6. The data transmission facility of claim 1, wherein:
    said data bus comprises a two-wire data line for half-duplex data transmission.

7. The data transmission facility of claim 1, wherein:
    said first level converter device comprises a bus interface connected to said data bus, and wherein said level converters of said first level converter device are connected concatenated via said bus interface.

8. The data transmission facility of claim 1, wherein:
    each of said second level converter devices comprises a bus interface connected to said data bus, and wherein said level converters of each respective second level converter device are connected concatenated via said bus interface.

9. The data transmission facility of claim 1, wherein:
    each of said second level converter devices comprises a transmitting level converter including an input connected to the respective data transmitter, an output connected to the input of a receiving level converter, and a control input connected to an inverting control input of said receiving level converter and to said control signal means, the output of said transmitting level converter and the input of said receiving level converter connected to said data bus.

* * * * *